United States Patent
Cheng

(10) Patent No.: US 6,508,605 B1
(45) Date of Patent: Jan. 21, 2003

(54) DIRECTION CHANGING DEVICE FOR A STROLLER HANDLE

(75) Inventor: Ying-Hsiung Cheng, Tainan Hsien (TW)

(73) Assignee: Pao-Hsien Cheng, Tainan Hsien (TW)

( * ) Notice: Subject to any disclaimer, the term of this patent is extended or adjusted under 35 U.S.C. 154(b) by 0 days.

(21) Appl. No.: 09/960,940

(22) Filed: Sep. 25, 2001

(51) Int. Cl.⁷ ................................................. B62B 7/08
(52) U.S. Cl. ........................ 403/83; 403/93; 280/47.36; 280/643; 280/648
(58) Field of Search ................................ 280/642, 643, 280/647, 648, 650, 47.36, 47.38; 403/83, 1.3, 92, 93, 95, 101, 102

(56) References Cited

U.S. PATENT DOCUMENTS

| | | | | |
|---|---|---|---|---|
| 4,435,012 A | * | 3/1984 | Kassai | 280/648 |
| 4,616,844 A | * | 10/1986 | Kassai | 280/47.38 X |
| 4,832,361 A | * | 5/1989 | Nakao et al. | 280/643 X |
| 5,029,886 A | * | 7/1991 | Takahashi et al. | 280/47.36 X |
| 5,513,864 A | * | 5/1996 | Huang | 280/47.36 |
| 6,073,945 A | * | 6/2000 | Cheng | 280/47.36 |
| 6,073,957 A | * | 6/2000 | Lan | 280/47.38 |
| 6,102,432 A | * | 8/2000 | Cheng | 280/47.36 X |
| 6,116,624 A | * | 9/2000 | Hu | 280/47.36 X |
| 6,299,194 B1 | * | 10/2001 | Chen | 280/47.38 |

\* cited by examiner

Primary Examiner—Lynne H. Browne
Assistant Examiner—David E. Bochna
(74) Attorney, Agent, or Firm—Rosenberg, Klein & Lee

(57) ABSTRACT

A direction changing device for a stroller handle includes two control elements each slidably connected to first elongated holes of one of the lateral tubes of the handle, locking elements slidably connected to second elongated holes of the lateral tubes, moving elements received in the tubes and connected to both the control elements and the locking elements, springs each connected to both a pin and a corresponding one of the locking elements for biasing the same downwards, and front and rear positioning members formed on the front portions and the rear portions of the main frame of the stroller respectively. The tubes are pivoted to the frame from lower ends and connected to a handle part from upper ends. The locking elements can engage the positioning members to lock the handle in position. When the control elements are moved up, the locking element are disengaged from the positioning members so as to allow the handle to be pivoted between the usual rearward position and a frontward position where the baby and the parent pushing the stroller can see each other.

2 Claims, 11 Drawing Sheets

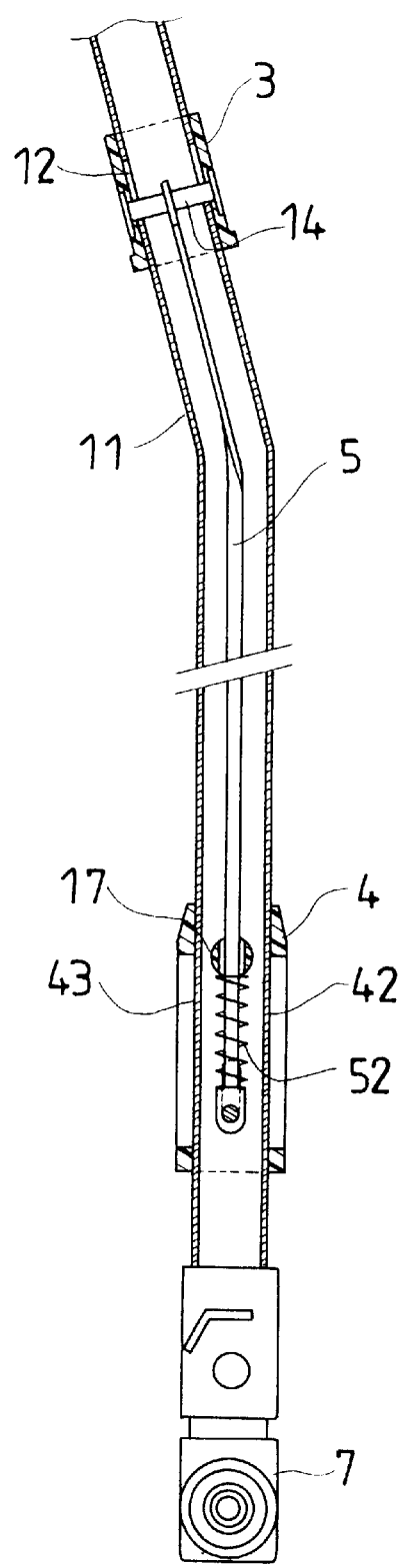
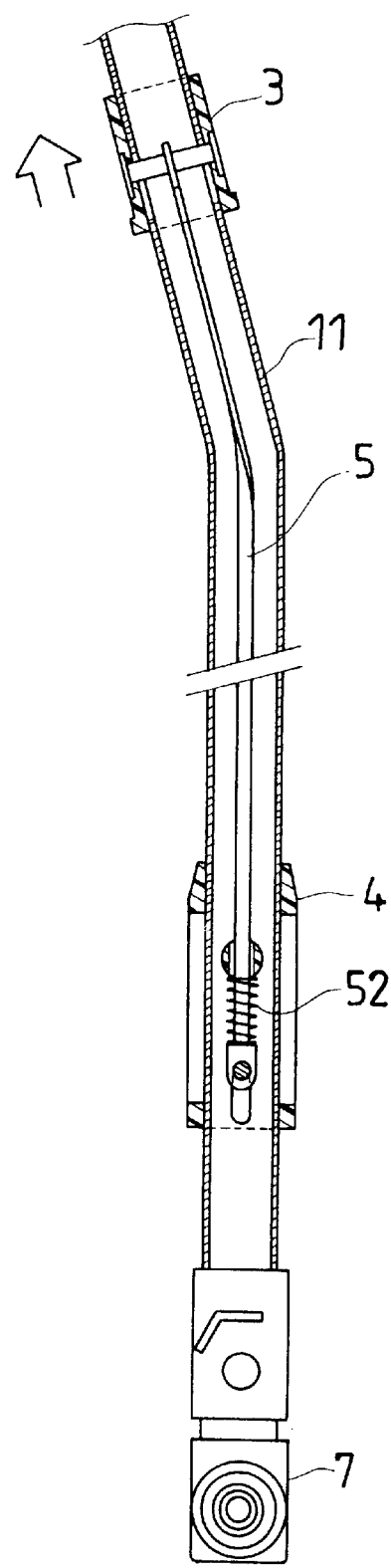
F I G. 4    F I G. 10

DIRECTION CHANGING DEVICE FOR A STROLLER HANDLE

BACKGROUND OF THE INVENTION

The present invention relates to a direction changing device for a stroller handle, and more particularly, to one which allows the user to easily and quickly change the direction of the handle as the need arises.

In order for the parent to be able to watch the baby lying on a stroller when he or she pushes the stroller along and for the baby to see its parent such that it can feel secure, an improvement on strollers has been made that is provided with a handle capable of being moved to an additional frontward position where the stroller is pushed with the original rear side becoming the front and the baby in the stroller can see the parent besides the usual rearward position where the baby and the parent pushing the stroller can't see each other because of the chair back and the sunshade top of the stroller.

However, most direction changing device provided for the handle are found to have drawbacks of either having too complicated structure or not being able to be easily operated.

SUMMARY OF THE INVENTION

Therefore, it is a main object of the present invention to provide a direction changing device for a stroller handle, which has relatively uncomplicated structure and can be operated very easily.

It is a second object of the present invention to provide a direction changing device for a stroller handle, of which the pivoted members are provided with polygonal holes for allowing the polygonal heads of the pivotal axles to be received therein so that the polygonal heads won't show to badly affect the appearance of the stroller.

It is a third object of the present invention to provide a direction changing device for a stroller handle, of which the movable locking elements can be engaged with the main frame of the stroller in such a manner that the handle won't shake sideways or back and forth in the in-use position.

The direction changing device of the present invention includes control elements slidably connected to upper elongated holes of the lateral tube parts of the handle, locking elements arranged on the outside of the tube parts and slidably connected to lower elongated holes of the lateral tubes parts, moving elements received in the tube parts and connected to both the control elements and the locking elements, springs received in the tube parts and connected to the locking elements to bias the locking elements downward, front positioning members formed on the front portions of the lateral members of the main frame, and rear positioning members formed on the rear parts of the main frame; the tube parts are pivoted to the main frame from the lower ends. The locking elements each has an engaging projections having an engaging gap; the engaging projections face inwardly of the stroller, and the gaps face down.

Thus, the handle can be moved between a usual rearward position and a frontward position when the control elements are moved up for the locking elements to separate from the front and the rear positioning members. In the rearward position, the engaging gaps of the locking elements engage the rear positioning members when the control elements are released. In the frontward position, the engaging gaps engage the front positioning members when the control elements are released from the upper position.

BRIEF DESCRIPTION OF THE DRAWINGS

This invention will be better understood by referring to the accompanying drawings, wherein:

FIG. 4 is a fragmentary sectional view of the device of the present invention.

FIG. 10 is a fragmentary sectional view of the device of the present invention with the control element being moved up.

DETAILED DESCRIPTION OF THE PREFERRED EMBODIMENT

Figure 1:
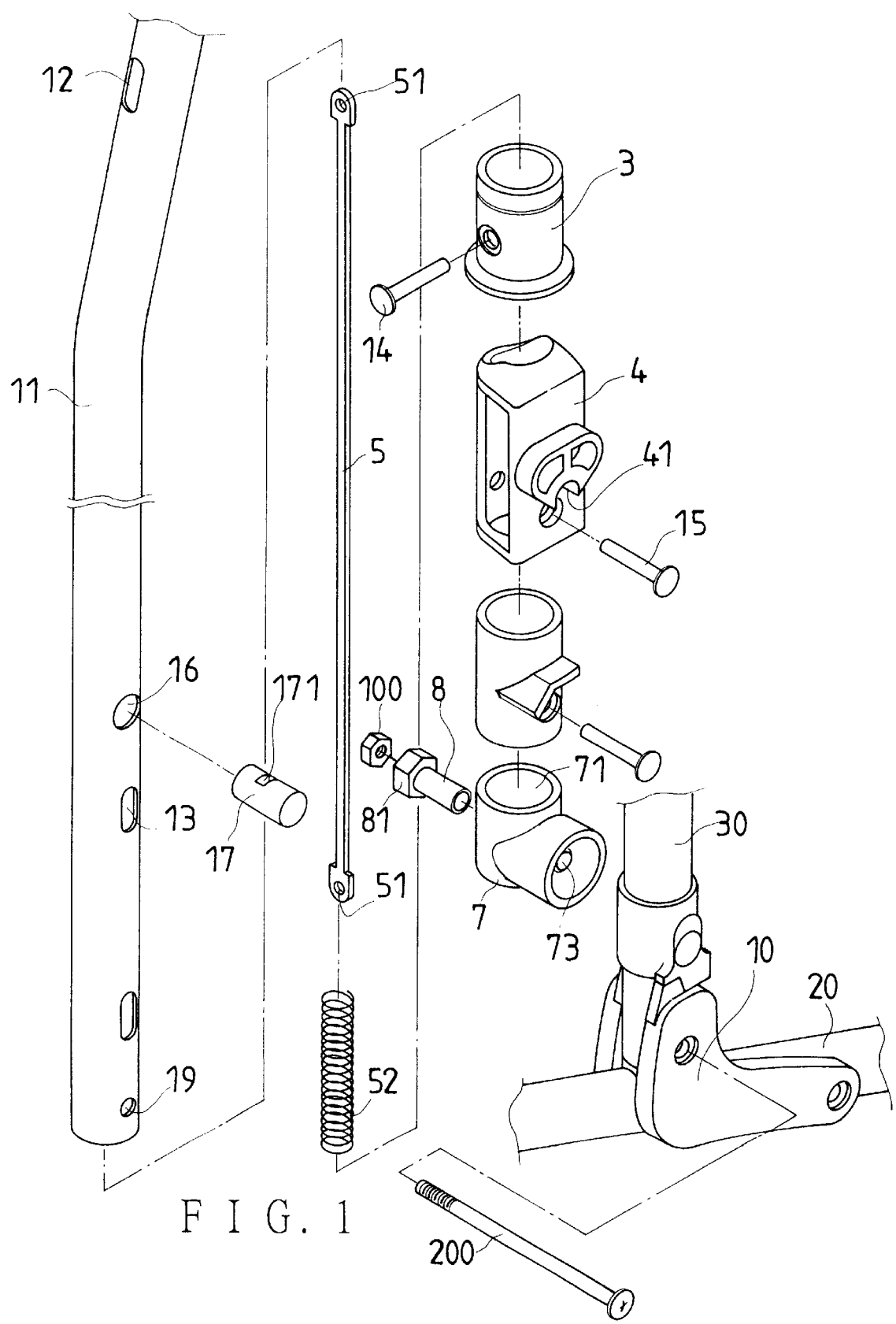
FIG. 1 is a fragmentary exploded perspective view of the direction changing device of the present invention.
Figure 2:
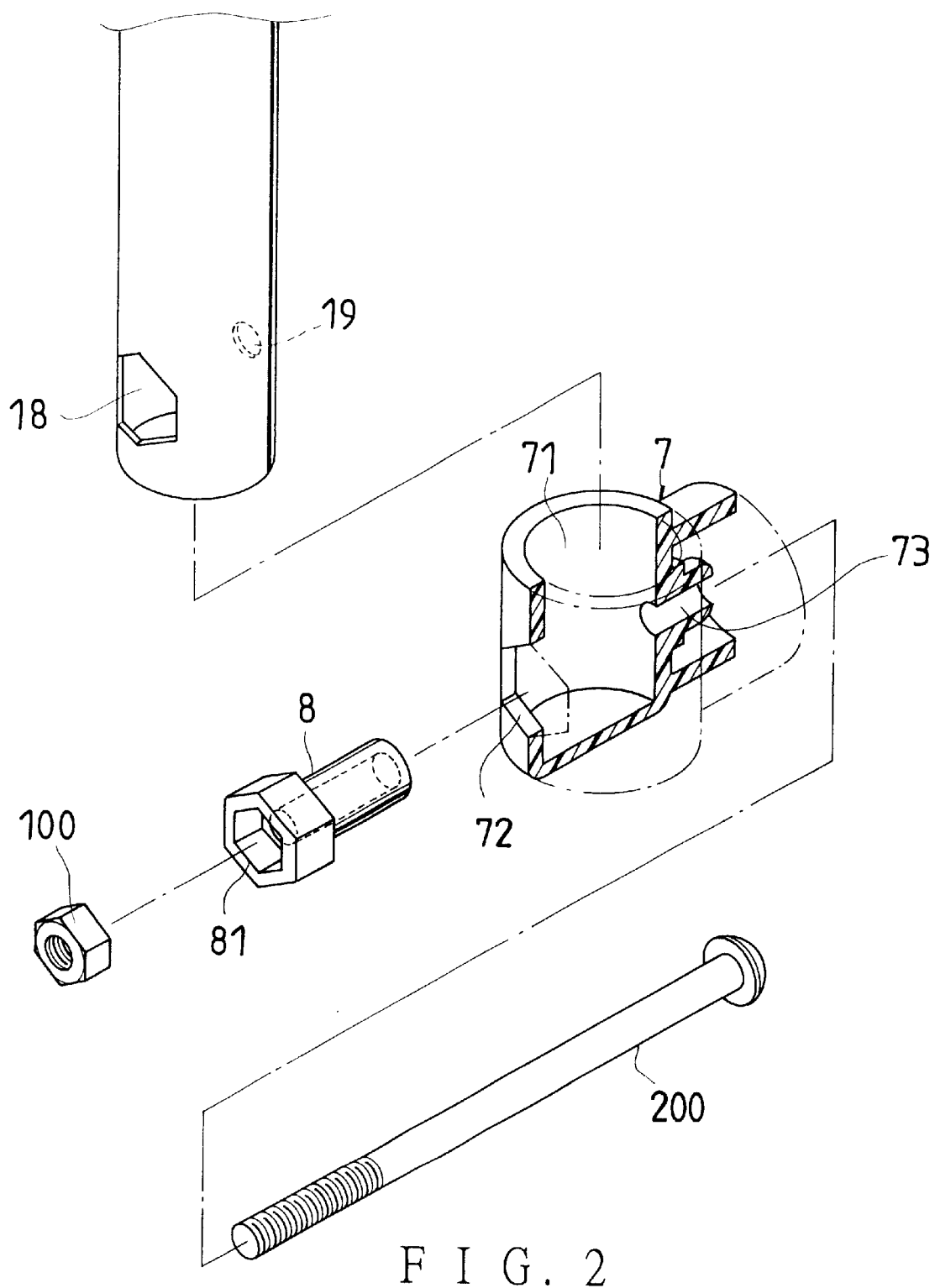
FIG. 2 is another fragmentary exploded perspective view of the direction changing device of the present invention.
Figure 3:
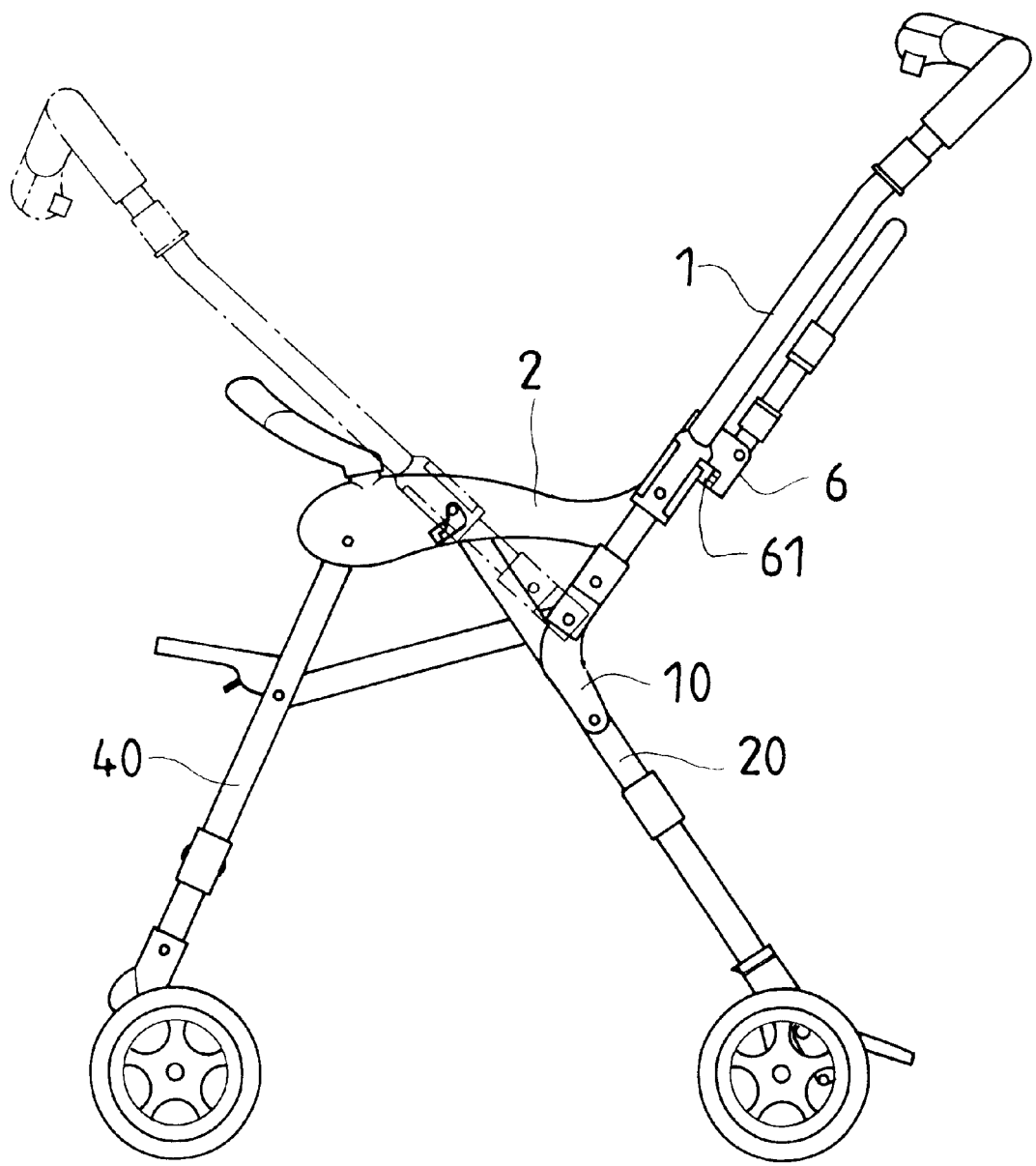
FIG. 3 is a side view of the stroller according to the present invention.

Referring to FIGS. 1, 2 and 3, a direction changing device for a stroller handle of the present invention includes a control element 3, a locking element 4, a moving element 5, a pivotal member 7, a pair of front positioning members 21 and a pair of rear positioning members.

Figure 5:
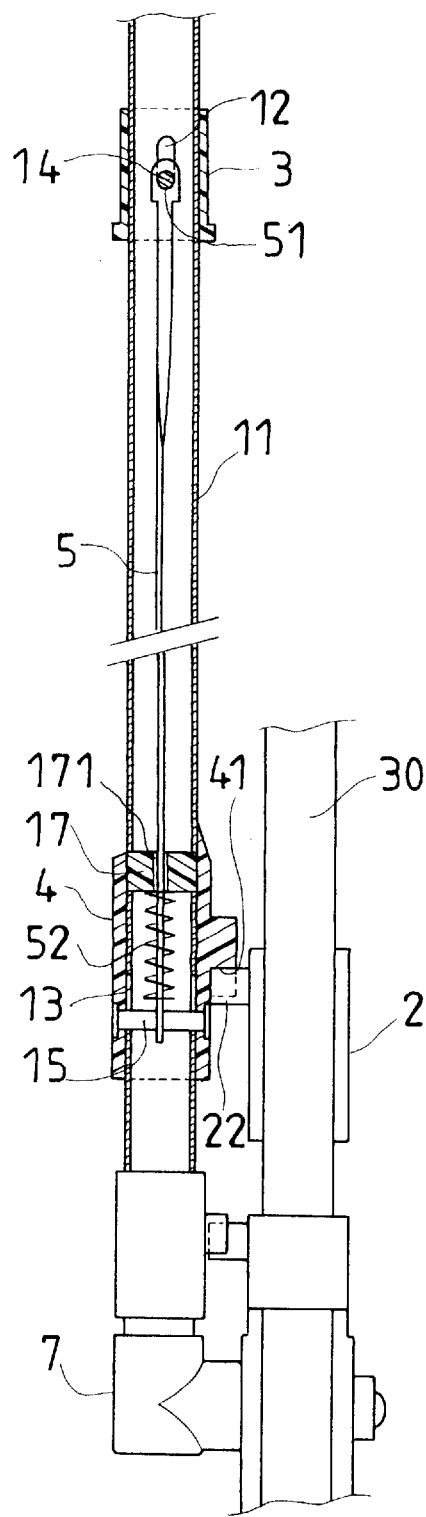
FIG. 5 is a fragmentary front sectional view of the device of the present invention.

The main frame of the stroller basically includes a pair front wheel support rods 40, a pair of rear wheel support rods 20, connecting elements 10, lateral parts 2 and a handle 1 as shown in FIG. 3, and a pair of chair back support rods 30 as shown in FIG. 1 and FIG. 5. the connection of the parts of the main frame is not the subject of the present invention, therefore it is not detailed here except for the connecting elements 10. Referring to FIG. 1 again, the connecting elements 10 are pivotally connected to the middle parts of the rear wheel support rods 20 from the lower ends, and connected to the lower ends of the chair back support rods 30 from the upper ends, and are formed with holes (not numbered) at the upper portions.

The handle 1 includes a horizontal handle part (not numbered), and two lateral supporting tube parts 11, which are connected to two ends of the handle part from the upper ends. The tube parts 11 each has two aligned elongated holes 12 at the upper part, a through hole 19 at the lower end, and two aligned through holes 16 between the holes 12 and the holes 19.

Referring to FIG. 2, the tube parts 11 each further has a polygonal hole 18 aligned with the hole 19. The tube parts 11 each pass through one of the control element 3, one of the locking elements 4 such that the control elements 3 are arranged above the corresponding locking elements. The moving elements 5 are each received in one of the tube parts 11, and each has holes 51 and 51 at the upper end and the lower end. A pin 14 is passed through each of the control elements 3, the elongated holes 12 of the related tube part 11, and the upper hole 51 of the related moving element 5 such that the control elements 3 can be moved up and down along the elongated hole 12 to make the moving parts 5 move in the same direction. A pin 17 is inserted into the through hole 16 of each of the tube parts 11, and has a through hole 171 for the related moving element 5 to pass through.

The locking elements 4 each has an engaging projection having an engaging gap 41; the engaging projection is formed on one lateral side facing inwardly of the stroller, and the gap 41 faces down. The locking elements 4 each further has connecting openings 42 and 43 (FIG. 7) at the front side and the rear side respectively. A pin 15 is passed through each of the locking elements 4, the elongated holes 13 of the related supporting tube parts 11, and the lower hole 51 of the related moving element 5 such that the locking element 4 can be moved in the same direction with the related control element 3. In addition, the lower parts of the moving elements 5 each passes through a spring 52 so as to position the spring 52 between the pin 15 and the pin 17 such that the locking elements 4 are biased down by the springs 52.

The lower ends of tube parts 11 are each connected to one of the pivotal members 7. Referring to FIG. 2, the pivotal members 7 each has a receiving room 71 for the related tube part 11 to pass into, a through hole 73, and a polygonal hole 72 aligned with the through hole 73. A sleeve 8 is inserted into the pivotal member 7, and has a polygonal head part 81 received in the polygonal hole 72; the polygonal head part 81 has a polygonal receiving room (not numbered), in which a nut 100 is received. A bolt 200 is passed through each of the connecting elements 10, the related chair back support rod 30, both the through hole 73 and the polygonal hole 72 of the related pivotal member 7, both the hole 19 and the polygonal hole 18 of the related tube part 11, and the related sleeve 8, and screwed into the related nut 100. Thus, the tube parts 11 can be pivoted on the bolts 200 together with the pivotal members 7. Furthermore, the polygonal holes 19 of the tube parts 11 are smaller than those of the pivotal parts 7.

Figure 6:
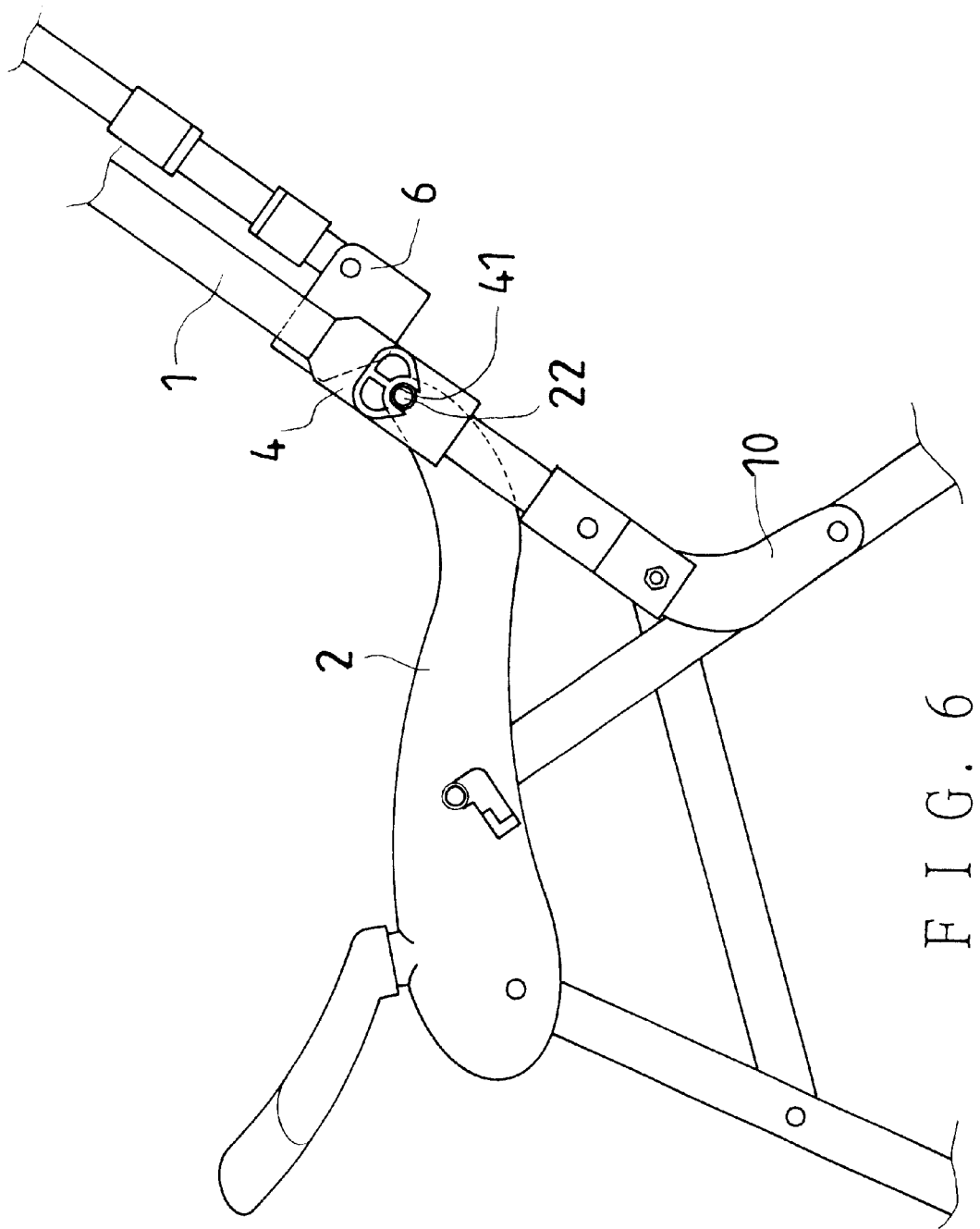
FIG. 6 is a fragmentary side view of the stroller according to the present invention.
Figure 7:
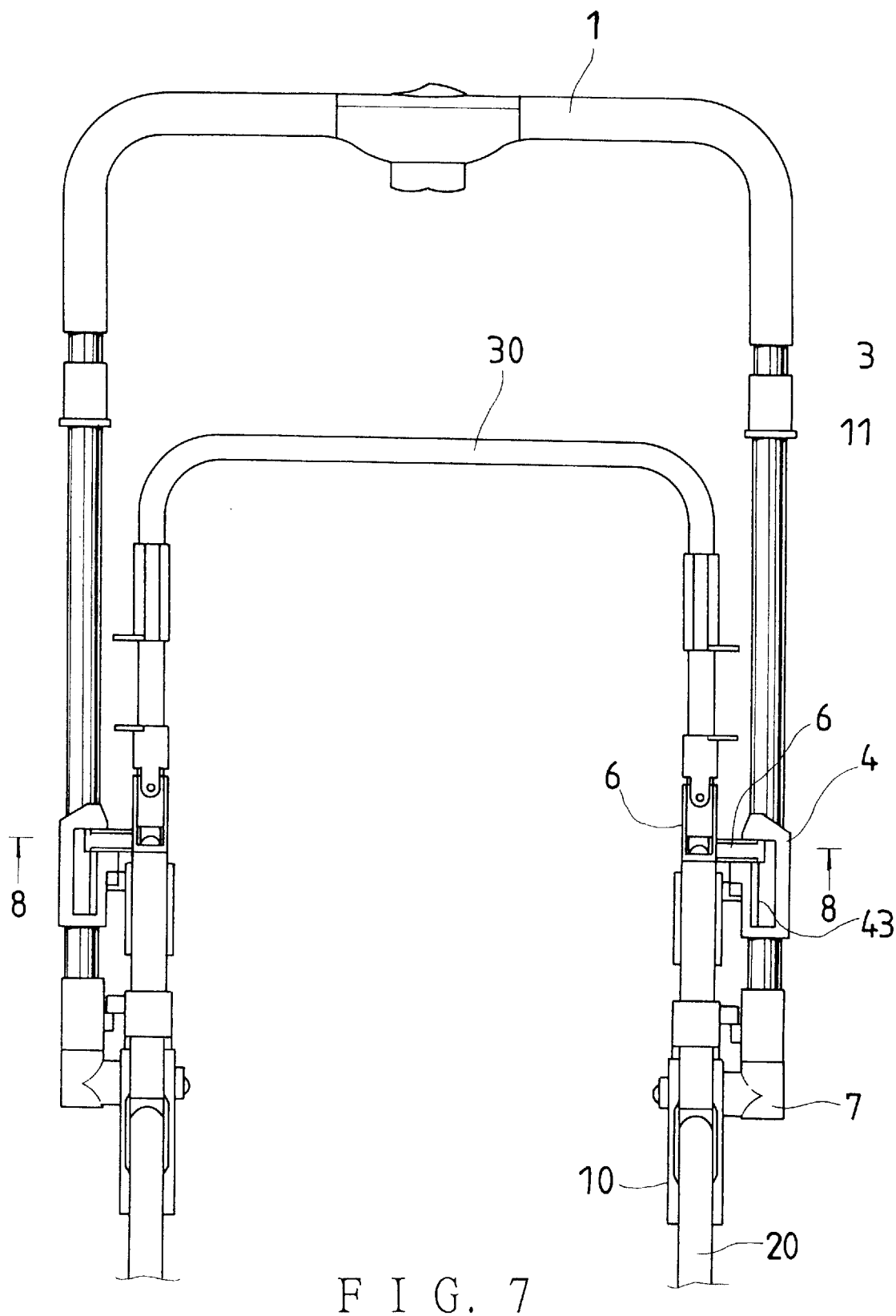
FIG. 7 is a fragmentary rear view of the present invention.
Figure 8:
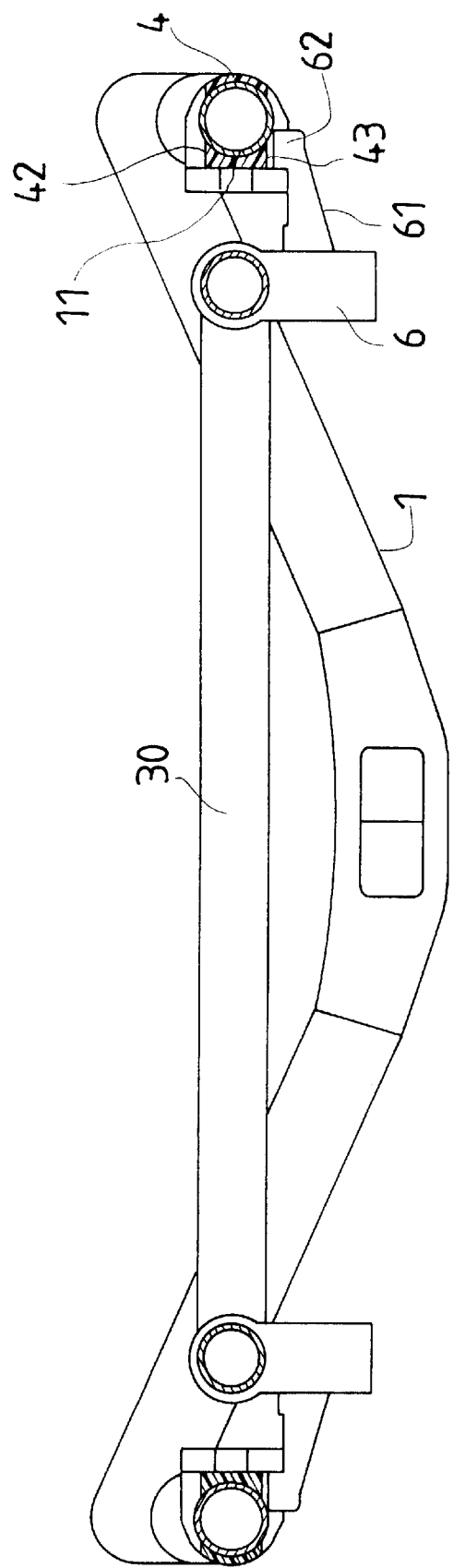
FIG. 8 is a sectional view taken along line 8—8 of FIG. 7.
Figure 9:
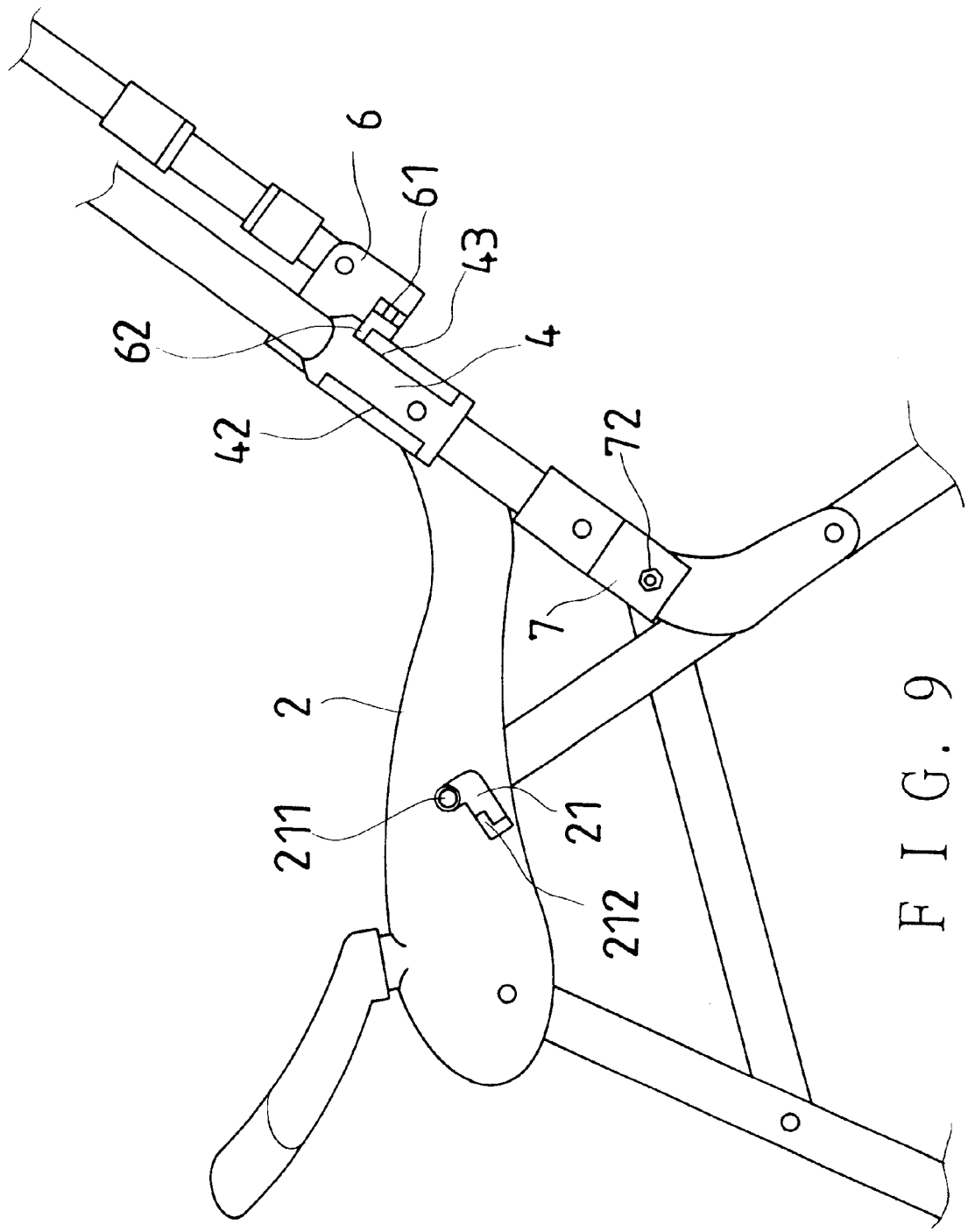
FIG. 9 is another fragmentary side view of the stroller according to the present invention.
Figure 12:
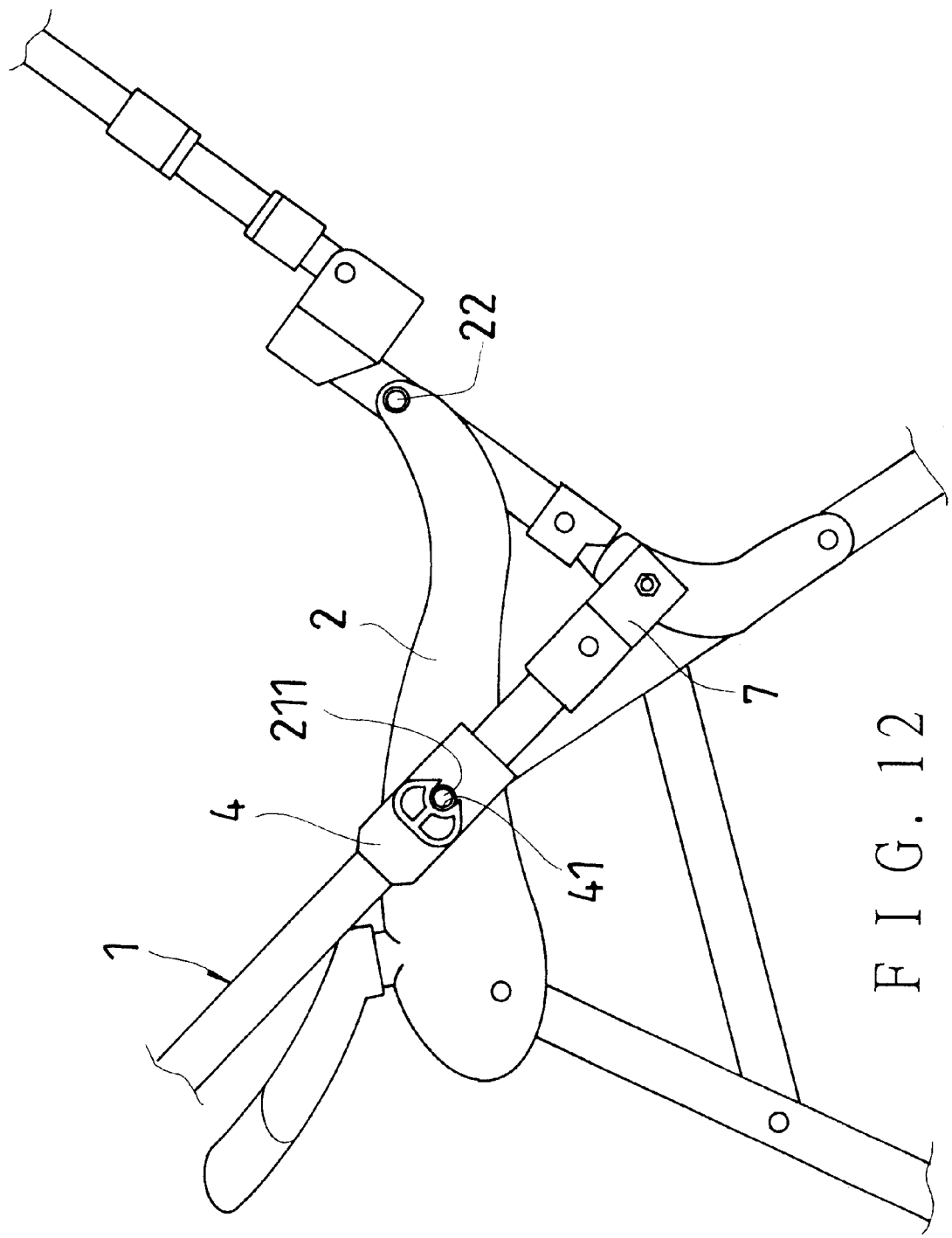
FIG. 12 is a view showing the connection between the handle and the positioning member on the frame in the frontward position.
Figure 13:
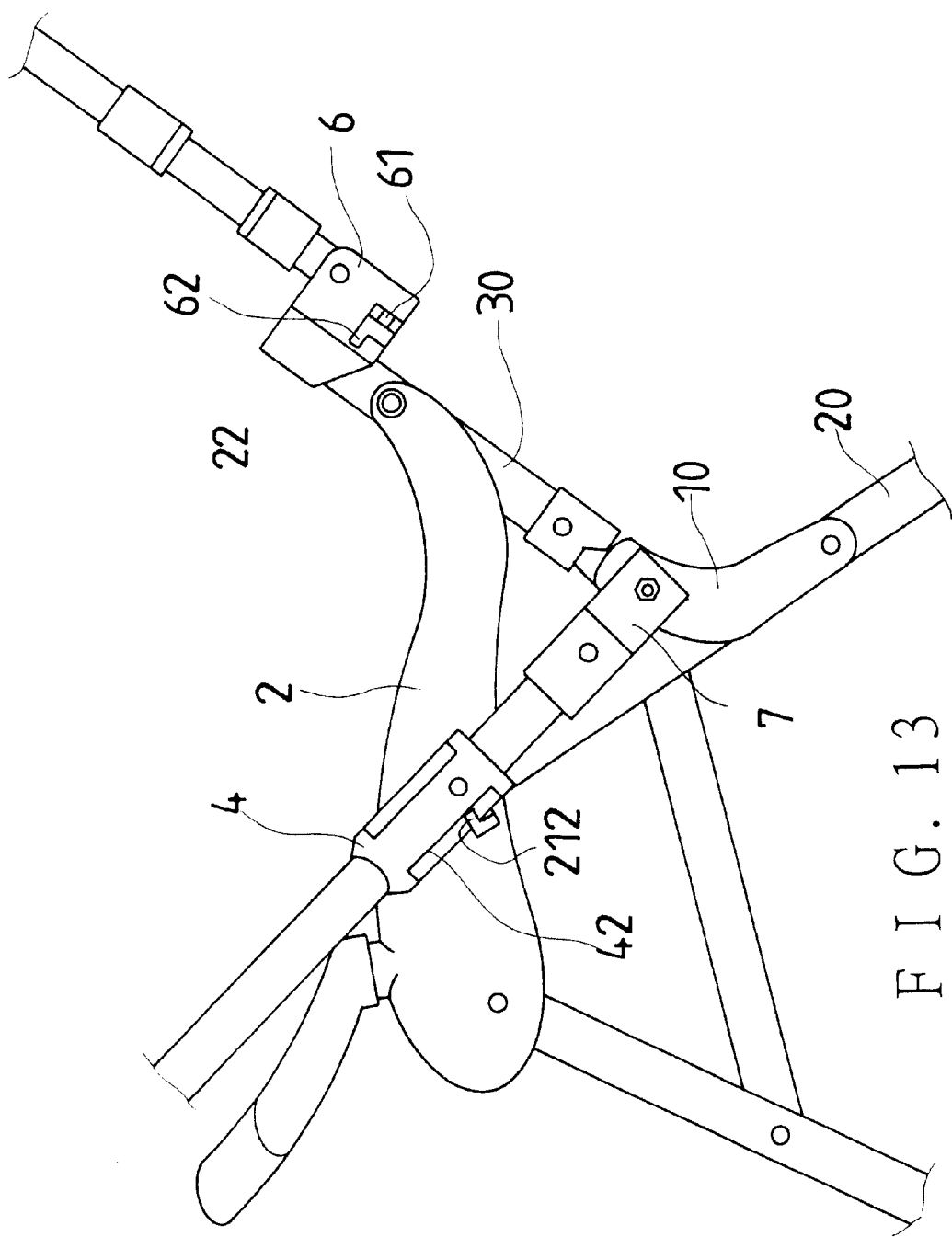
FIG. 13 is another view showing the connection between the handle and the positioning member on the frame in the frontward position.

Referring to FIGS. 3, 6 and 7, the front positioning members 21 are formed on each of the lateral parts 2 of the main frame, and each has an engaging projection 211, and a stopping block 212 having a securing projection (not numbered). The rear positioning members each includes a main body 6 provided on the related one of the chair back support rods 30, and an engaging projection 22 formed on the rear end of the related lateral part 2. The main bodies 6 each has an extension part 61 having a securing projection 62 sticking out therefrom.

Figure 11:
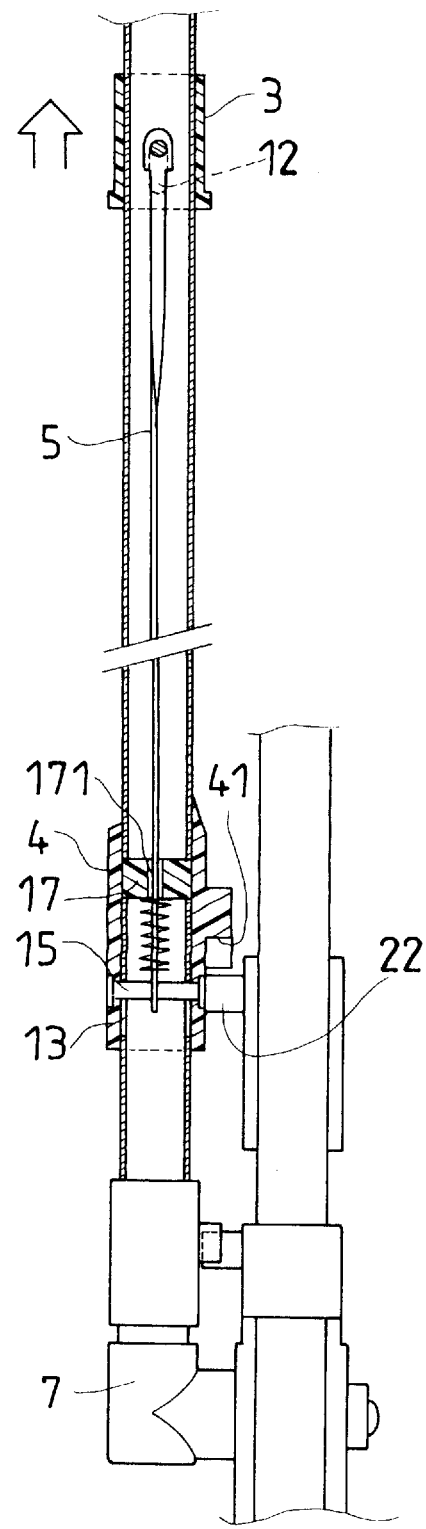
FIG. 11 is a fragmentary front sectional view of the device of the present invention with the control element being moved up.

Thus, the handle 1 of the stroller can be pivoted between a rearward position as shown in FIGS. 6 and 7 and a frontward position as shown in FIGS. 10 and 11 after the control elements 3 have been moved up so as to lift the locking elements 4 to an unlocking position where the engaging gaps 41 separate from the engaging projections 211 and 22 formed on the lateral parts 2 of the main frame. When the handle 1 is pivoted to the reward position, the extension parts 61 of the rear positioning members will stop the tube parts 11 from moving any further, and the securing projections 62 will engage the rear connecting openings 43 of the locking elements 4. In addition, the engaging gaps 41 will engage the rear engaging projections 22 when the control elements 3 are released for allowing the springs 52 to bias the locking elements 4 downwards. Thus, the user can push the stroller along with the baby in the stroller chair facing the direction of the stroller.

When the handle 1 is pivoted to the frontward position, the stopping block 212 will stop the tube parts 11 from moving any further, and the securing projections of the blocks 212 will engage the front openings 42 of the locking elements 4. And, the control elements 3 are released for the gaps 41 of the locking elements 4 to engage the engaging projections 211. Thus, the user can push the stroller along with the baby in the stroller facing him or her.

From the above description, it can be easily seen that the direction changing device for a stroller handle has the following desirable features:

1. The device can be used very easily because the user only has to move the control elements 3 up along the tube parts 11 for the handle 1 to become pivotable and the control elements 3 are arranged on the upper ends of the tube parts 11, i.e. very close to the handle part of the handle 1.
2. The engaging projections having the engaging gaps 41 are formed on the lateral sides of the locking elements 4 which face inwardly of the stroller, therefore they will not show to badly affect the appearance of the stroller.
3. The nuts 100 connected to the bolts 200 provided as the pivot of the handle are received in the polygonal head parts of the sleeves 8, in other words the nuts 100 can't be easily seen, therefore the same won't badly affect the appearance of the stroller.
4. Because of the engagement of the connecting openings of locking elements with the securing projections of the positioning members, the handle won't shake sideways in the secured in-use position, and the engagement of the engaging gaps of the locking elements with the engaging projections of the positioning members can prevent the handle from shaking back and forth.

What is claimed is:

1. A direction changing device for a stroller handle, comprising a pair of control elements each having a first pin passed through same and a pair of first aligned elongated holes of a respective one of two lateral tube parts of said handle so as to be able to move up and down along said tube part; said lateral tube parts being each connected to one end of a horizontal handle part of said handle from an upper end; said lateral tube parts being each pivoted to a respective side of a main frame of said stroller from a lower end; said tube parts each having two second aligned elongated holes at a lower end portion thereof and two aligned through holes between said first elongated holes and said second elongated holes;

a pair of locking elements; said tube parts being each passed through related one of said locking elements with a second pin passing through said related locking element and said second elongated holes for allowing said locking element to move up and down therealong;

a third holed pin being passed through said through holes of each of said tube parts; said locking elements each having an engaging projection having an engaging gap; said engaging projections being formed on lateral sides of said locking elements facing inwardly of said stroller; said engaging gaps facing down; said locking elements each having two connecting openings at a front side and a rear side respectively;

a pair of moving elements each received in one of said tube parts; said moving elements being each connected to a related one of said first pins from an upper ends and passed through a related one of said third pins; said moving elements being each passed through a spring positioned between related one of said second pins and related one of said third pins and connected to said related second pin from a lower end such that said locking elements can move together with said control elements when said control elements are moved upward along said tube parts; said springs being capable of biasing said locking elements downward;

a pair of front positioning members each formed on one of two lateral parts of said main frame of said stroller; said front positioning members each having a second engaging projection and a stopping block having a second securing projection;

a pair of rear positioning members each formed on one of rear ends of two lateral sides of said main frame; said rear positioning members each having a third engaging projections and an extension part having a third securing projection;

said handle being movable between a rearward position and a frontward position when said control elements are moved up to disengage said locking elements from said front and said rear positioning members; in said rearward position of said handle, said extension parts stopping said handle lateral tube parts from moving further rearwards, said third securing projections engaging said rear connecting openings of said locking elements to prevent said handle from shaking sideways, and said engaging gaps fitting onto said third engaging projections so as to fix said tube parts in position; in said frontward position of said handle, said stopping blocks stopping said tube park from moving further forwards, said second securing projections engaging said front connecting openings to prevent said handle from shaking sideways, and said engaging gaps fitting onto said second engaging projections so as to fix said tube parts in position.

2. The direction changing device for a stroller handle as claimed in claim 1, wherein said lower ends of said tube parts are each connected to a pivotal member, and said pivotal member is pivoted to said main frame; said pivotal members each having a through hole and a polygonal hole aligned with said through hole thereof; said lower ends of said tube parts each having a through hole facing said through hole of said pivotal member and a polygonal hole facing said polygonal hole of said pivotal member; sleeves being connected to said polygonal holes of said pivotal members and said tube parts from polygonal head parts thereof and connected to said through holes of said pivotal members and said tube parts from other ends; bolts being passed through parts of said main frame; which said pivotal members correspond to, and through said sleeves so as to pivot said handle tube parts thereon; said bolts being screwed into nuts received in polygonal receiving rooms of said polygonal head parts of said sleeves.

* * * * *